(12) United States Patent
Elnozahy et al.

(10) Patent No.: US 8,448,027 B2
(45) Date of Patent: May 21, 2013

(54) ENERGY-EFFICIENT FAILURE DETECTION AND MASKING

(75) Inventors: Elmootazbellah Nabil Elnozahy, Austin, TX (US); Mark William Stephenson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 100 days.

(21) Appl. No.: 12/789,045

(22) Filed: May 27, 2010

(65) Prior Publication Data

US 2011/0296242 A1    Dec. 1, 2011

(51) Int. Cl.
*G06F 11/00* (2006.01)

(52) U.S. Cl.
USPC .............. 714/41; 714/25; 714/33; 714/38.1; 714/47.1

(58) Field of Classification Search
USPC .............. 714/3, 10, 17, 25, 32, 33, 35, 38.1, 714/47.1, 47.2, 49, 41
See application file for complete search history.

(56) References Cited

U.S. PATENT DOCUMENTS

| | | | |
|---|---|---|---|
| 6,021,272 A | 2/2000 | Cahill et al. | |
| 6,161,219 A | 12/2000 | Ramkumar et al. | |
| 6,615,366 B1* | 9/2003 | Grochowski et al. | 714/10 |
| 6,633,897 B1 | 10/2003 | Browning et al. | |
| 6,658,621 B1 | 12/2003 | Jamil et al. | |
| 6,681,345 B1 | 1/2004 | Storino et al. | |
| 7,331,043 B2 | 2/2008 | Saulsbury | |
| 7,516,025 B1* | 4/2009 | Williams et al. | 702/57 |
| 7,676,795 B2 | 3/2010 | Elnozahy | |
| 7,707,578 B1 | 4/2010 | Zedlewski et al. | |
| 2007/0011513 A1* | 1/2007 | Biswas et al. | 714/722 |
| 2007/0074169 A1* | 3/2007 | Chess et al. | 717/126 |
| 2008/0168305 A1* | 7/2008 | Gschwind et al. | 714/10 |
| 2009/0049451 A1 | 2/2009 | Bates | |
| 2009/0113240 A1* | 4/2009 | Vera et al. | 714/17 |
| 2009/0164399 A1 | 6/2009 | Bell, Jr. et al. | |
| 2011/0055777 A1* | 3/2011 | Tremaine et al. | 716/106 |

OTHER PUBLICATIONS

Balman, M.; "Failure-Awareness and Dynamic Adaptation in Data Scheduling"; Google; Dec. 2008.
Rajagopalan-et al.; "Thread Scheduling for Multi-Core Platforms"; Google; 2008-2009.
Gupta-et al.; "Adaptive Online Testiing for Efficient Hard Fault Detection"; Google; 2008.
Winter-et al.; "Scheduling Algorithms for Unpredictably Heterogeneous CMP Architectures"; Google; 2008-2009.

* cited by examiner

*Primary Examiner* — Joseph D Manoskey
(74) *Attorney, Agent, or Firm* — Garg Law Firm, PLLC; Rakesh Garg; Eustus D. Nelson

(57) ABSTRACT

A method, system, and computer usable program product for energy-efficient soft error failure detection and masking are provided in the illustrative embodiments. A soft error is injected to occur during execution of a set of instructions. If an output of the execution of the set of instructions is incorrect, a record is made of the instruction that was affected by the injected soft error and led to the incorrect result. This identified instruction is designated as vulnerable to the soft error. Several soft errors are injected with different input data sets over several executions of the same set of instructions, and a probability of each instruction in the instruction set is computed, the probability of an instruction accounting for the vulnerability of the execution of the instruction sets to errors that affect the instruction. A report including several probabilities of instruction vulnerabilities is produced.

29 Claims, 4 Drawing Sheets

ENERGY-EFFICIENT FAILURE DETECTION AND MASKING

RELATED APPLICATION

The present invention is related to similar subject matter of co-pending and commonly assigned U.S. patent application Ser. No. 12,788,968 entitled "Tolerating soft errors by selective duplication," filed on May 27, 2010, which is hereby incorporated by reference.

BACKGROUND OF THE INVENTION

1. Field of the Invention

The present invention relates generally to an improved data processing system, and in particular, to a computer implemented method for improving failure tolerance in data processing systems. Still more particularly, the present invention relates to a computer implemented method, system, and computer usable program code for energy-efficient failure detection and masking.

2. Description of the Related Art

An application may produce an incorrect output during execution. The incorrect output may be caused by an error in the code or by a soft error. A soft error is an error that occurs when, for example, a bit in a memory gets set or reset without an instruction of the application causing the bit to change.

Failure detection is the process of detecting errors, including soft errors, as they arise during execution of instructions. A soft error is not a permanent failure because the same bit may not flip and the same error may not occur again during another execution of the application. Some reasons for soft errors are noise, power surges, and cosmic radiation.

A soft error can be corrected by rewriting the incorrect data with the correct data, such as by setting an affected bit to the correct state. Current technology provides methods for handling soft errors such as by redundantly computing the results of an instruction and detecting divergence and possibly correcting the results via voting, and/or by using error correction coding to check when the contents of a register is changed. This invention is concerned with errors that affect computations.

SUMMARY OF THE INVENTION

The illustrative embodiments provide a method, system, and computer usable program product for soft error related energy-efficient failure detection and masking. An embodiment injects, in a data processing system, a first soft error to occur during execution of a set of instructions in the data processing system. Further, the embodiment configures a first set of input data to said set of instructions. The embodiment records, if an output of the execution of the said set of instructions is incorrect, that the instruction at which the first soft error is injected is vulnerable to soft errors given as input the first set of input data.

Another embodiment configures a second set of input data to said set of instructions. The embodiment records, if an output of the execution of said set of instructions is incorrect, that the instruction at which the first soft error is injected is vulnerable to soft errors given as input the second set of input data.

Another embodiment further injects a second soft error. The embodiment performs a second execution of the set of instructions, the second execution producing a correct result. The embodiment records that the instruction is not vulnerable to the second soft error. The probability further accounts for the instruction not being vulnerable to the second soft error.

Another embodiment repeats the execution of a set of instructions with injecting a plurality of soft errors at said instruction, given as input to the set of instructions a plurality of input data sets. It then computes a probability of the instruction being vulnerable to soft errors, the probability accounting for the probability that the injected plurality of soft errors would affect the output of the set of instructions given as input a plurality of input data sets. The embodiment produces a report, the report including several probabilities, a probability in the several probabilities corresponding to an instruction in the set of instructions.

In another embodiment, the first soft error is configured using information in a training set of errors, and the training set of errors includes information for injecting the plurality of soft errors.

In another embodiment, the instruction corresponds to a program code of an application executing in the data processing system. The embodiment further receives a vulnerability threshold value. The embodiment generates a second instruction corresponding to the program code. The embodiment evaluates whether the probability of the instruction from the report exceeds the vulnerability threshold value. The embodiment instruments, if the evaluation is affirmative, the second instruction for detecting a failure caused by a soft error.

Another embodiment further instruments, if the evaluation is affirmative, the second instruction for correcting the failure.

Another embodiment further instruments, if the evaluation is affirmative, the second instruction for masking the failure.

In another embodiment, the instrumenting further generates a third instruction, the third instruction informing an execution hardware that the second instruction is to be duplicated.

In another embodiment, the instrumenting generates a fourth instruction, the fourth instruction duplicating a computation of the second instruction.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
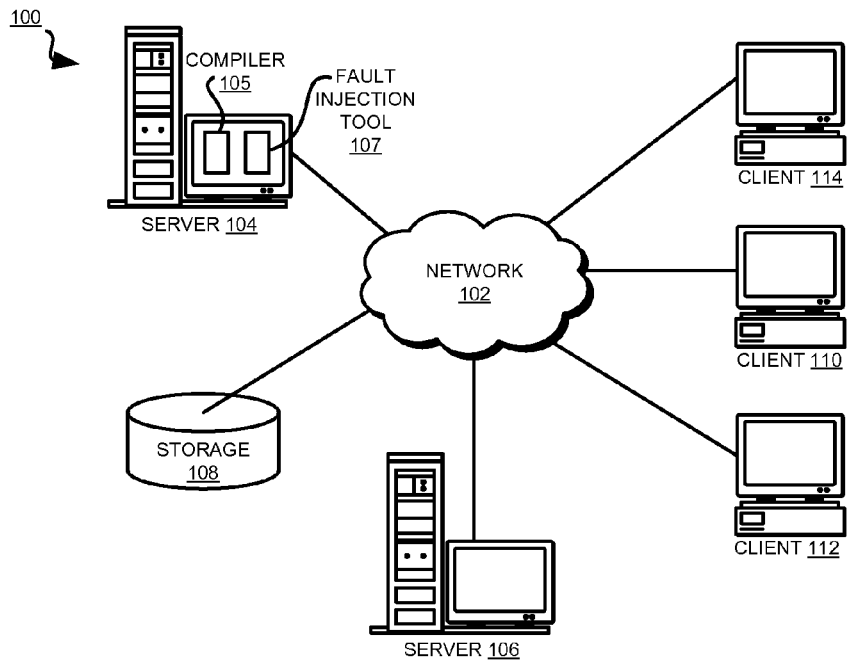
FIG. 1 depicts a pictorial representation of a network of data processing systems in which the illustrative embodiments may be implemented.

Soft errors are becoming an increasing concern as applications increase in complexity, data processing system circuitry becomes more complex, and the potential for soft errors broadens. In the prior art, soft errors are handled using fault detection and/or masking methods that constitute a significant cost factor. For example, some prior art methods use electronic circuitry to protect data path, registers, and other regions of memory from soft errors. Typically, these electronic circuits provide fault detection, error correction, and masking features to protect against a variety of errors including soft errors.

For example, a hardware solution for error detection includes sophisticated circuitry that performs a checksum or similar computation on the result of an instruction. The hardware may execute the instruction in a time redundant mode on the same circuit and then compare the results.

Another hardware solution may execute the instruction in a space-redundant mode by executing the instruction on two similar circuits and then comparing the results. Hardware based masking solutions may add another computation and vote out the computation likely to include an error.

The invention recognizes that such prior art circuitry for handling soft errors is nontrivially expensive. The invention further recognizes that the prior art methods are broadly applied as a catchall solution for soft errors. Consequently, the cost of those methods includes not just the cost of hardware fabrication but also the cost of energy consumed.

For example, the prior art method that employs space-redundant circuits (hardware duplication) for detecting and eliminating soft error, the cost includes, among other costs, the energy and other computing resources consumed in operating the circuits. The prior art method that employs duplicate execution of an instruction in time (temporal duplication incurs cost that includes, among other costs, the time, the energy, and other computing resources consumed in performing duplicate executions. The invention recognizes that with advancement in technology, tight constraints are being placed on the energy consumed by the new systems and components.

The invention further recognizes that some soft errors may not affect an output of an application at all. Some soft errors may affect the output but in insignificant ways. Accordingly, the invention recognizes that an economical and efficient method of tolerating soft errors need not handle all soft errors that are possible. The invention further recognizes that not all instructions of the code of an application are equally susceptible to soft errors.

The illustrative embodiments used to describe the invention generally address and solve the above-described problems and other problems related to handling soft errors. The illustrative embodiments of the invention provide a method, computer usable program product, and data processing system for energy-efficient fault detection and masking.

An embodiment may instrument the instructions of an application such that soft errors are detected, corrected, and masked in a more energy-efficient manner as compared to the prior art methods. Certain embodiments of the invention are described with respect to soft errors only as examples. The embodiments are generally application to other types of errors as well that are observed during execution of instructions.

The illustrative embodiments are described with respect to data, data structures, and identifiers only as examples. Such descriptions are not intended to be limiting on the invention. For example, an illustrative embodiment described using one method of identifying a selected instruction may be implemented using a different method of identifying the selected instruction within the scope of the invention.

Furthermore, the illustrative embodiments may be implemented with respect to any type of data processing system. For example, an illustrative embodiment described with respect to a single processor may be implemented in a multiprocessor or multi-core processor system within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to a certain type of training set may be implemented using another type, size, and arrangement of training error data, in a similar manner within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in a combination of hardware and software. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
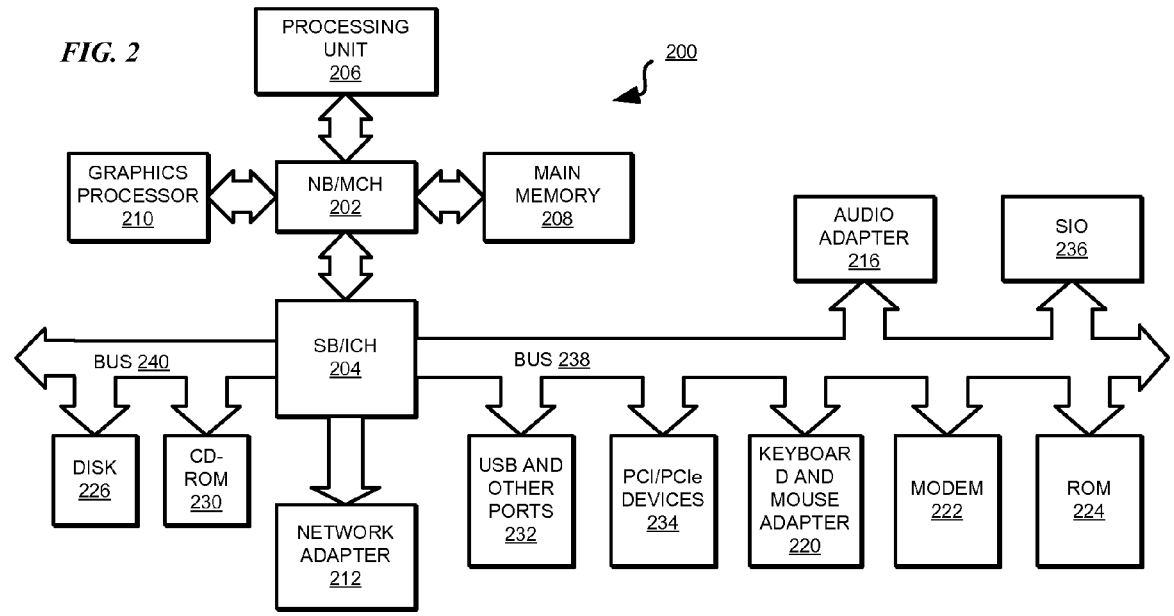
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include compiler 105. Compiler 105 may select and identify an instruction for duplication in accordance with an illustrative embodiment. Server 104 also includes fault injection tool 107. Fault injection tool 107 simulates errors, including soft errors, while executing instructions of an application. Fault injection tool 107 is used to conduct fault injection experiments to determine the vulnerability of certain instructions to errors according to an embodiment of this invention.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux° (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
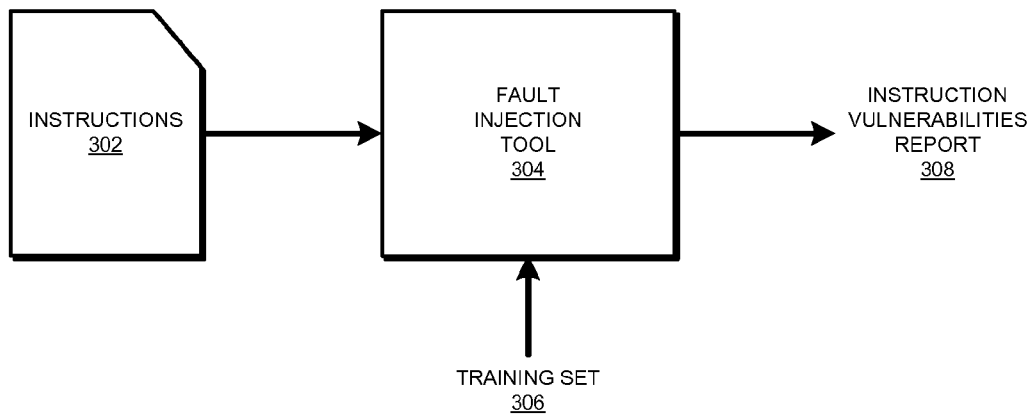
FIG. 3 depicts a block diagram of an example configuration for determining vulnerabilities of the instructions of an application to errors in accordance with an illustrative embodiment.

With reference to FIG. 3, this figure depicts a block diagram of an example configuration for determining vulnerabilities of the instructions of an application to errors in accordance with an illustrative embodiment. Instructions 302 may be a set of instructions for executing an application in a data processing system. For example, a compiler, such as compiler 105 in FIG. 1, may generate instructions 302 from the program code of the application. A set of instructions is one or more instructions.

Fault injection tool 304 may be implemented using fault injection tool 107 in FIG. 1. Training set 306 may include information to cause one or more soft errors to occur during the execution of an instruction from instructions 302. Training set 306 may include other information, such as configuration information, program input data, descriptions or comments on certain soft errors, or code that may or may not contribute directly to the soft error simulation using training set 306. Any number of training sets 306 may be used during the fault injection experiments according to an embodiment of this invention.

Fault injection tool 304 accepts training set 306 as input. Fault injection tool 304 creates, generates, or simulates, a set of errors, including soft errors, as an instruction from instructions 302 is executed. Fault injection tool 304 analyzes the effect of a soft error on the execution of the set of instructions. Based on the analysis, fault injection tool 304 decides whether the instruction was susceptible to the soft error such that the set of instructions produced an incorrect output when the soft error condition existed.

An instruction may be susceptible to a soft error during one execution and not susceptible during another, such as due to a combination of errors being simulated, different input data sets, or other factors. Fault injection tool 304 may execute instructions 302 multiple times using several combinations of training sets 306, and perform the analysis and susceptibility computations. Based on the analysis and susceptibility computations out of all runs, fault injection tool 304 determines the probability of an instruction being vulnerable to soft errors by simply computing the number of times an instruction produced an error that had an effect on the final output of the application, and dividing this figure by the total number of runs.

Instruction vulnerabilities report 308 may be a documentation of how vulnerable an instruction is to soft errors, and consequently, how likely the instruction is to produce an incorrect result that affects the final application output when a soft error is encountered during the instruction's execution. Report 308 may take any form suitable for an implementation. For example, report 308 may be a flat file, an index file, or a set of database records.

Figure 4:
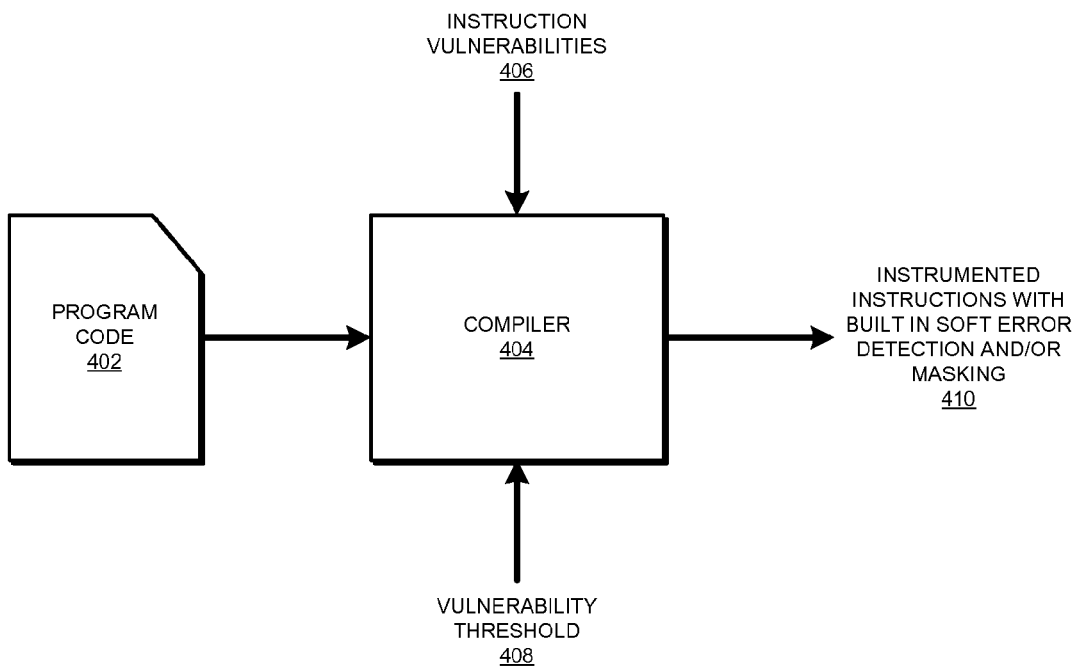
FIG. 4 depicts a block diagram of another example configuration for generating instructions instrumented for energy-efficient failure detection and masking in accordance with an illustrative embodiment.

With reference to FIG. 4, this figure depicts a block diagram of another example configuration for generating instructions instrumented for energy-efficient failure detection and masking in accordance with an illustrative embodiment. Program code 402 may be the program code of an application, such as the program code from which instructions 302 in FIG. 3 were generated. Compiler 404 may be implemented by modifying compiler 105 in FIG. 1 according to an embodiment of this invention.

Compiler 404 accepts as inputs program code 402 and instruction vulnerabilities 406. Instruction vulnerabilities 406 can be all or part of instruction vulnerabilities report 308 in FIG. 3.

Compiler 404 may further receive vulnerability threshold 408 as another input. Vulnerability threshold 408 is a value or amount of vulnerability to soft errors that is acceptable when instructions of program code 402 are executed. For example, threshold 408 may be set at one percent, providing that only those instructions should be instrumented for failure detection and/or masking for soft errors whose probability of being susceptible to soft errors exceeds one percent (or, 0.01 probability).

Based on inputs 402, 406, and 408, compiler 404 generates instructions 410. Instructions 410 include instrumentation for failure detection and/or masking for soft errors for only those instructions whose vulnerability exceeds threshold 408. Instrumenting instructions 410 in this manner, an embodiment conserves energy expended in failure detection and/or masking for soft errors when the instructions are executed. In contrast with prior art, not all instructions are subjected to failure detection and/or masking by temporal duplication, hardware duplication, or other method. According to an embodiment, only those instructions that are specifically instrumented for this purpose are subjected to further error detection, correction, or masking computations using an available technique.

Thus, by avoiding error detection, correction, or masking computations for some instructions, an embodiment provides an energy-efficient failure detection and masking methodology for handling soft errors. Instructions may be instrumented for error detection, correction, or masking computations according to an embodiment using physical redundancy or time-based redundancy, for instance using a hardware solution referenced elsewhere in the disclosure, or a software solution using redundant and check instructions.

Figure 5:
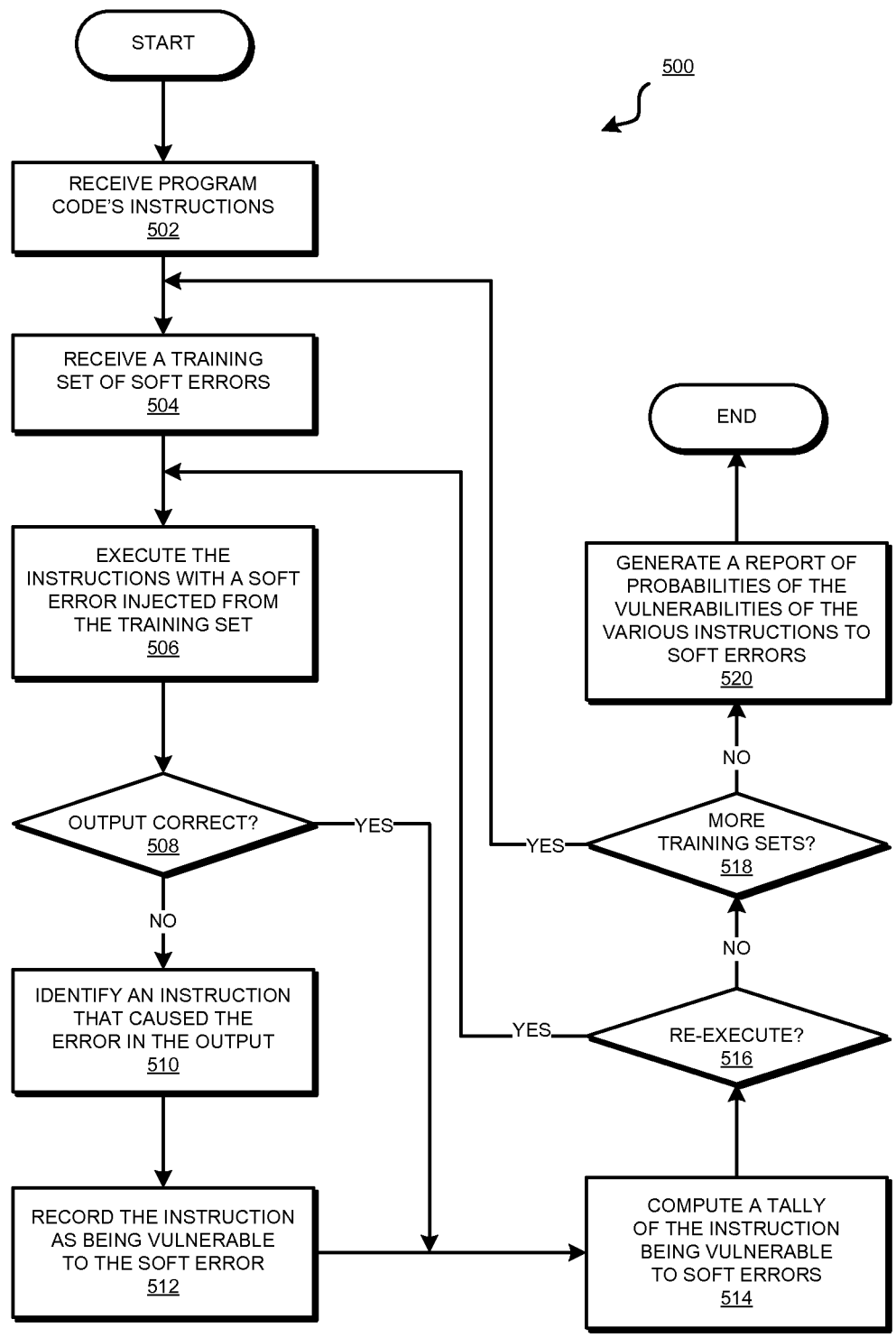
FIG. 5 depicts a flowchart of an example process of determining instruction vulnerabilities to soft errors in accordance with an illustrative embodiment.

With reference to FIG. 5, this figure depicts a flowchart of an example process of determining instruction vulnerabilities to soft errors in accordance with an illustrative embodiment. Process 500 may be implemented in a fault injection tool, such as fault injection tool 304 in FIG. 3.

Process 500 begins by receiving a set of instructions corresponding to the program code of an application (step 502). Process 500 also receives a training set of soft errors (step 504).

Process 500 executes the instructions with a soft error injected from the training set (step 506). Training sets contain simulated soft errors and different data input sets to the application. Process 500 determines whether the output generated by the set of instructions is correct (step 508).

If the output of the set of instructions is incorrect ("No" path of step 508), process 500 identifies the instruction that caused the error in the output (step 510). Process 500 records the instruction as being vulnerable to the soft error (step 512). Process 500 computes a probability of each instruction identified as vulnerable to soft errors (step 514). If the output of the set of instructions is correct ("Yes" path of step 508), process 500 proceeds to step 514 and performs the computation.

Process 500 determines whether to re-execute the instructions with some or all of the soft errors in the training set of step 504 (step 516). For instance, some application programs are nondeterministic in the sense that they may produce different valid results for the same input set. In such cases, it may be desirable to re-execute the instructions with some or all of the soft errors in training set of step 504. Such repetition ensures that the test covers different possible effects of soft errors for nondeterministic applications. If the instructions should be re-executed ("Yes" path of step 516), process 500 returns to step 506.

If the instructions need not be re-executed ("No" path of step 516), process 500 determines whether more training sets should be used, such as to refine the error tallies computed in step 514 (step 518). If another training set should be used ("Yes" path of step 518), process 500 returns to step 504. If the training is complete ("No" path of step 518), process 500 generates a report of the probabilities of the vulnerabilities of the various instructions to soft errors, such as in report 308 in FIG. 3), by computing the error tallies against the total number of runs for each instruction (step 520). Process 500 ends thereafter.

Figure 6:
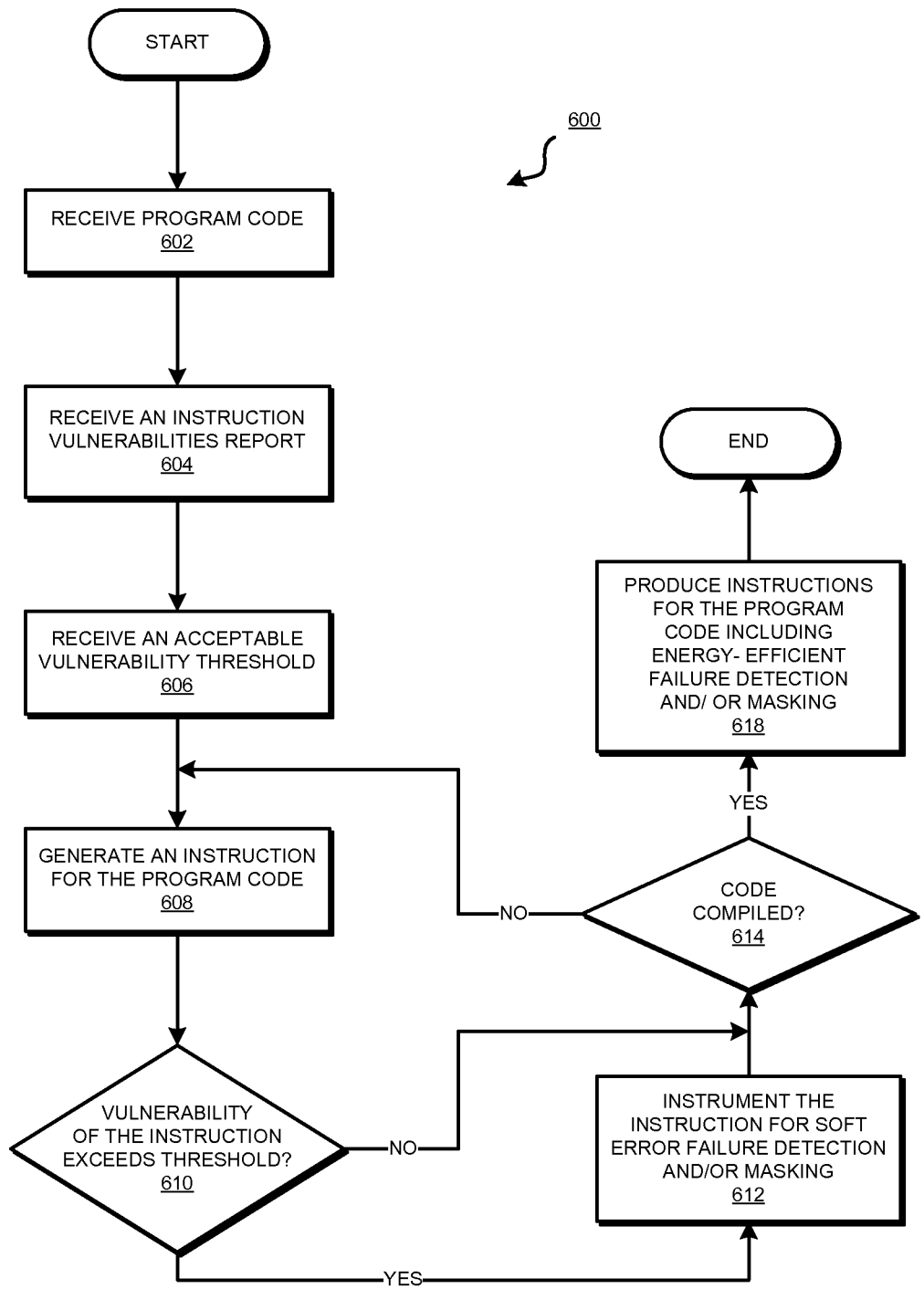
FIG. 6 depicts a flowchart of an example process of instrumenting instructions of a program code for energy-efficient failure detection and/or masking in accordance with an illustrative embodiment.

With reference to FIG. 6, this figure depicts a flowchart of an example process of instrumenting instructions of a program code for energy-efficient failure detection and/or masking in accordance with an illustrative embodiment. Process 600 may be implemented in a compiler improved with an embodiment, such as compiler 404 in FIG. 4.

Process 600 begins by receiving the program code of an application (step 602). Process 600 also receives an instruction vulnerability report, such as report 308 in FIG. 3 (step 604). Process 600 receives a vulnerability threshold, such as threshold 408 in FIG. 4, that is acceptable during the execution of the application (step 606).

Process 600 generates an instruction for a part of the program code (step 608). Process 600 determines whether the vulnerability of the instruction, as identified in the report of step 604, exceeds the threshold of step 606 (step 610). If the vulnerability of the instruction exceeds the threshold ("Yes" path of step 610), process 600 instruments the instruction for soft error failure detection and/or masking (step 612). This could be done, for instance, by adding code to repeat the computation of the instruction and compare the results for detection or masking. If the vulnerability of the instruction is at or below the threshold ("No" path of step 610), process 600 proceeds to step 614.

Process 600 determines whether the compilation of the program code of step 602 is complete (step 614). If the compiling is not complete ("No" path of step 614), process 600 returns to step 608. If the compiling is complete ("Yes" path of step 614), process 600 produces the instructions for the program code including energy-efficient instrumentation for soft error failure detection and/or masking (step 618). Process 600 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for energy-efficient soft error failure detection and/or masking. Using an embodiment of the invention, the cost of handling soft errors in a data processing environment can be reduced.

An embodiment may reduce the cost of handling soft errors by instrumenting only those instructions for failure detection, correction, or masking, that are susceptible to soft errors beyond an acceptable threshold of vulnerability. An embodiment may thus avoiding large scale soft error failure detection, correction, and masking computations, which consume computing resources including energy.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for energy-efficient soft error failure detection, the computer implemented method comprising:

injecting, in a data processing system, a first simulated soft error to occur during execution of a set of instructions in the data processing system, wherein a soft error is a temporary error condition in which a bit value in a data storage device undergoes a change without a computation causing the change;

executing instructions from the set of instructions;

identifying, responsive to an output of executing the set of instructions being incorrect, an instruction that was affected by first simulated soft error and led to the incorrect result;

recording, that the identified instruction is vulnerable to the first simulated soft error;

computing a probability of the identified instruction being vulnerable to a plurality of soft errors, the probability accounting for the vulnerability of the identified instruction to the first simulated soft error; and producing a report, the report including a plurality of probabilities, a probability in the plurality of probabilities corresponding to an instruction in the set of instructions.

2. The computer implemented method of claim 1, further comprising:

injecting a second simulated soft error;

performing a second execution of the set of instructions, the second execution producing a correct result; and recording that the instruction affected by the first simulated soft error is not vulnerable to the second simulated soft error, wherein the probability further accounts for the instruction not being vulnerable to the second simulated soft error.

3. The computer implemented method of claim 1, wherein the first simulated soft error is configured using information in a training set of errors, the training set of errors including information for injecting the plurality of soft errors.

4. The computer implemented method of claim 3, wherein the training set of errors includes information for using different input data sets for different executions.

5. The computer implemented method of claim 1, wherein the instruction corresponds to a program code of an application executing in the data processing system, further comprising:

receiving a vulnerability threshold value;

generating a second instruction corresponding to the program code;

evaluating whether the probability of the instruction from the report exceeds the vulnerability threshold value; and instrumenting, responsive to the evaluating being affirmative, the second instruction for detecting a failure caused by a soft error.

6. The computer implemented method of claim 5, further comprising:

instrumenting, responsive to the evaluating being affirmative, the second instruction for correcting the failure.

7. The computer implemented method of claim 5, further comprising:

instrumenting, responsive to the evaluating being affirmative, the second instruction for masking the failure.

8. The computer implemented method of claim 5, wherein the instrumenting comprises:

generating a third instruction, the third instruction informing an execution hardware that the second instruction is to be duplicated.

9. The computer implemented method of claim 5, wherein the instrumenting comprises:

generating a third instruction, the third instruction duplicating a computation of the second instruction.

10. A computer usable program product comprising a non-transitory computer usable storage medium including computer usable code for energy-efficient soft error failure detection, the computer usable code comprising:

computer usable code for injecting, in a data processing system, a first simulated soft error to occur during execution of a set of instructions in the data processing system, wherein a soft error is a temporary error condition in which a bit value in a data storage device undergoes a change without a computation causing the change;

computer usable code for executing a instructions from the set of instructions;

computer usable code for identifying, responsive to an output of executing the set of instructions being incorrect, an instruction that was affected by first simulated soft error and led to the incorrect result;

computer usable code for recording, recording, that the identified instruction is vulnerable to the first simulated soft error;

computer usable code for computing a probability of the identified instruction being vulnerable to a plurality of soft errors, the probability accounting for the vulnerability of the identified instruction to the first simulated soft error; and computer usable code for producing a report, the report including a plurality of probabilities, a probability in the plurality of probabilities corresponding to an instruction in the set of instructions.

11. The computer usable program product of claim 10, further comprising:

computer usable code for injecting a second simulated soft error;

computer usable code for performing a second execution of the set of instructions, the second execution producing a correct result; and computer usable code for recording that the instruction affected by the first simulated soft error is not vulnerable to the second simulated soft error, wherein the probability further accounts for the instruction not being vulnerable to the second simulated soft error.

12. The computer usable program product of claim 10, wherein the first simulated soft error is configured using an information in a training set of errors, the training set of errors including information for injecting the plurality of soft errors.

13. The computer usable program product of claim 12, wherein the training set of errors includes information for using different input data sets for different executions.

14. The computer usable program product of claim 10, wherein the instruction corresponds to a program code of an application executing in the data processing system, further comprising:

computer usable code for receiving a vulnerability threshold value;

computer usable code for generating a second instruction corresponding to the program code;

computer usable code for evaluating whether the probability of the instruction from the report exceeds the vulnerability threshold value; and computer usable code for instrumenting, responsive to the evaluating being affirmative, the second instruction for detecting a failure caused by a soft error.

15. The computer usable program product of claim 14, further comprising:

computer usable code for instrumenting, responsive to the evaluating being affirmative, the second instruction for correcting the failure.

16. The computer usable program product of claim 14, further comprising:

computer usable code for instrumenting, responsive to the evaluating being affirmative, the second instruction for masking the failure.

17. The computer usable program product of claim 14, wherein the computer usable code for instrumenting comprises:

computer usable code for generating a third instruction, the third instruction informing an execution hardware that the second instruction is to be duplicated.

18. The computer usable program product of claim 14, wherein the computer usable code for instrumenting comprises:

computer usable code for generating a third instruction, the third instruction duplicating a computation of the second instruction.

19. The computer usable program product of claim 10, wherein the computer usable code is stored in a computer readable storage medium in a data processing system, and wherein the computer usable code is transferred over a network from a remote data processing system.

20. The computer usable program product of claim 10, wherein the computer usable code is stored in a computer readable storage medium in a server data processing system, and wherein the computer usable code is downloaded over a network to a remote data processing system for use in a computer readable storage medium associated with the remote data processing system.

21. A data processing system for energy-efficient soft error failure detection, the data processing system comprising:

a storage device including a storage medium, wherein the storage device stores computer usable program code; and a processor, wherein the processor executes the computer usable program code, and wherein the computer usable program code comprises:

computer usable code for injecting, in a data processing system, a first simulated soft error to occur during execution of a set of instructions in the data processing system, wherein a soft error is a temporary error condition in which a bit value in a data storage device undergoes a change without a computation causing the change;

computer usable code for executing a instructions from the set of instructions;

computer usable code for identifying, responsive to an output of executing the set of instructions being incorrect, an instruction that was affected by first simulated soft error and led to the incorrect result;

computer usable code for recording, recording, that the identified instruction is vulnerable to the first simulated soft error;

computer usable code for computing a probability of the identified instruction being vulnerable to a plurality of soft errors, the probability accounting for the vulnerability of the identified instruction to the first simulated soft error; and computer usable code for producing a report, the report including a plurality of probabilities, a probability in the plurality of probabilities corresponding to an instruction in the set of instructions.

22. The data processing system of claim 21, further comprising:

computer usable code for injecting a second simulated soft error;

computer usable code for performing a second execution of the set of instructions, the second execution producing a correct result; and computer usable code for recording that the instruction affected by the first simulated soft error is not vulnerable to the second simulated soft error, wherein the probability further accounts for the instruction not being vulnerable to the second simulated soft error.

23. The data processing system of claim 21, wherein the first simulated soft error is configured using an information in a training set of errors, the training set of errors including information for injecting the plurality of soft errors.

24. The data processing system of claim 23, wherein the training set of errors includes information for using different input data sets for different executions.

25. The data processing system of claim 21, wherein the instruction corresponds to a program code of an application executing in the data processing system, further comprising:
computer usable code for receiving a vulnerability threshold value;
computer usable code for generating a second instruction corresponding to the program code;
computer usable code for evaluating whether the probability of the instruction from the report exceeds the vulnerability threshold value; and
computer usable code for instrumenting, responsive to the evaluating being affirmative, the second instruction for detecting a failure caused by a soft error.

26. The data processing system of claim 25, further comprising:
computer usable code for instrumenting, responsive to the evaluating being affirmative, the second instruction for correcting the failure.

27. The data processing system of claim 25, further comprising:
computer usable code for instrumenting, responsive to the evaluating being affirmative, the second instruction for masking the failure.

28. The data processing system of claim 25, wherein the computer usable code for instrumenting comprises:
computer usable code for generating a third instruction, the third instruction informing an execution hardware that the second instruction is to be duplicated.

29. The data processing system of claim 25, wherein the computer usable code for instrumenting comprises:
computer usable code for generating a third instruction, the third instruction duplicating a computation of the second instruction.

* * * * *